(12) United States Patent
Huang et al.

(10) Patent No.: US 11,154,797 B2
(45) Date of Patent: Oct. 26, 2021

(54) FILTERING DEVICE AND CONTROL SYSTEM

(71) Applicant: BESTWAY INFLATABLES & MATERIAL CORP., Shanghai (CN)

(72) Inventors: Shuiyong Huang, Shanghai (CN); Xiaobo Chen, Shanghai (CN); Changde Wan, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 16/680,923

(22) Filed: Nov. 12, 2019

(65) Prior Publication Data

US 2020/0147523 A1 May 14, 2020

(51) Int. Cl.
*B01D 27/10* (2006.01)
*B01D 35/143* (2006.01)
(Continued)

(52) U.S. Cl.
CPC ......... *B01D 27/108* (2013.01); *B01D 27/101* (2013.01); *B01D 35/143* (2013.01);
(Continued)

(58) Field of Classification Search
CPC .. B01D 27/101; B01D 27/108; B01D 35/143; B01D 35/1435; B01D 35/26;
(Continued)

(56) References Cited

U.S. PATENT DOCUMENTS

| 4,864,287 A | * | 9/1989 | Kierstead | H01H 35/24 340/648 |
| 5,246,571 A | | 9/1993 | Woltmann | |

(Continued)

FOREIGN PATENT DOCUMENTS

| CA | 2057925 | 11/1990 |
| EP | 1116938 | 7/2001 |

OTHER PUBLICATIONS

Extended European Search Report dated Mar. 19, 2020 (Mar. 19, 2020) issued by the European Patent Office on related European patent application 19207347.6.

(Continued)

*Primary Examiner* — Terry K Cecil
(74) *Attorney, Agent, or Firm* — Dickinson Wright PLLC

(57) ABSTRACT

A filtering device includes a water pump, a filter cartridge, and a communicating tube for coupling the water pump with the filter cartridge. The filtering device further includes a flow switch attached to the communicating tube and configured to change switching states in response to a water flow rate in the communicating tube being lower than a predetermined value. The filtering device further includes a reminding device operably connected to the water flow switch. The reminding device generates a reminder signal when the state of the water flow indicates that the flow rate of the water in the communicating tube is lower than the predetermined value. The control system includes a control panel for the filtering pump, a central control system, and a filtration detecting system. The control panel is connected to the central control system and the central control system is connected to the filtration detecting system.

19 Claims, 14 Drawing Sheets

(51) Int. Cl.
  *C02F 103/42* (2006.01)
  *G01F 1/28* (2006.01)
  *B01D 35/26* (2006.01)

(52) U.S. Cl.
  CPC .......... *B01D 35/26* (2013.01); *C02F 2103/42* (2013.01); *C02F 2209/40* (2013.01); *G01F 1/28* (2013.01)

(58) Field of Classification Search
  CPC ............... B01D 37/043; C02F 2103/42; C02F 2209/40; G01F 15/001; G01F 15/125; G01F 1/28
  See application file for complete search history.

(56) References Cited

U.S. PATENT DOCUMENTS

| | | | |
|---|---|---|---|
| 6,032,540 A | 3/2000 | Hawkins | |
| 7,638,042 B2* | 12/2009 | Astle | B01D 27/101 |
| | | | 210/100 |
| 2005/0028609 A1* | 2/2005 | Langemann | G01F 1/28 |
| | | | 73/861.74 |
| 2007/0163929 A1 | 7/2007 | Stiles et al. | |
| 2018/0354833 A1* | 12/2018 | Van Riper | E04H 4/1209 |

OTHER PUBLICATIONS

European Examination Report dated Feb. 4, 2021 (Feb. 4, 2021) issued on related European patent application 19207347.6 issued by the European Patent Office.

* cited by examiner

FILTERING DEVICE AND CONTROL SYSTEM

CROSS REFERENCE TO RELATED APPLICATIONS

This utility patent application claims the benefit of Chinese patent application No. CN 201821831157.9, filed Nov. 12, 2018, the content of which is herein incorporated by reference in its entirety.

TECHNICAL FIELD

The present disclosure relates to the field of the filtration of pool water. More specifically, the present disclosure relates to a filtering device and a control system.

BACKGROUND

Generally, after a pool is used for a period of time, the quality of the water in the pool will deteriorate and dirt may accumulate in the pool. In order to maintain the water quality and prevent dirt from accumulating, the pool needs to be cleaned and maintained regularly. One approach is to clean the pool after the water in the pool is drained. This approach is time consuming and laborious and wastes water resources. Another approach is to provide a filtering device. The water in the pool can be filtered continuously or at regular intervals by the filtering device, thus reducing or avoiding the accumulation of dirt in the pool. After the water from the pool is filtered by the filtering device, the filtered water is returned to the pool by the filtering device. Thus, the water in the pool can be recycled. Since the second approach saves time and effort and does not waste water resources, pools are commonly equipped with filtering devices to filter the water in the pools.

Conventional filtering devices include a filter cartridge, an electric pump, and a connecting tube connected between the filter cartridge and the electric pump. A filtering device may further include a base defining a recess, with the filter cartridge and the electric pump mounted in the recess of the base.

After the filtering device is used for a period of time, dirt filtered out by the filter core of the filtering device gradually accumulates until it reaches a saturated state, reducing the performance of the filtering device. At this time, it is necessary to clean or replace the filter core.

The filter cartridge or the filter core of a conventional filtering device, for example, may be cleaned or replaced at a fixed frequency which may be manually estimated. Waste and/or inefficiency may result if the filter cartridge or the filter core is cleaned or replaced prematurely. If the filter cartridge or the filter core is not cleaned or replaced when the filtering device is saturated, water quality may be affected and dirt may accumulate in the pool. Therefore, there is a need to improve existing filtering devices.

SUMMARY

In accordance with various embodiments of the present disclosure, a filtering device comprises a water pump, a filter cartridge, and a communicating tube configured to provide fluid communication between the water pump and the filter cartridge. A flow switch is attached to the communicating tube and configured to detect a fluid flow rate in the communicating tube being less than a predetermined value indicative of a service condition for the filter cartridge.

In some embodiments, the filtering device also comprises a reminding device operatively coupled to the flow switch and configured to indicate the fluid flow rate in the communicating tube being less than the predetermined value.

In some embodiments, the reminding device comprises a display device, a sound generating device or a communication module. In some embodiments, the reminding device comprises a display device configured to generate a visual indication in response to the fluid flow rate in the communicating tube being less than the predetermined value. In some embodiments, the reminding device comprises a sound generating device configured to generate an audible alert in response to the fluid flow rate in the communicating tube being less than the predetermined value. In some embodiments, the reminding device comprises a communication module configured to transmit an alert to a remote receiver in response to the fluid flow rate in the communicating tube being less than the predetermined value.

In some embodiments, the flow switch is configured to be in an open state in response to the fluid flow rate in the communicating tube being lower than the predetermined value.

In some embodiments, the flow switch comprises a housing disposed on a wall of the communicating tube, a pivot arm connected to the housing and being pivotable between the communicating tube and the housing, a magnetic block disposed at an end of the pivot arm, and a reed switch disposed inside of the housing. The pivot arm is biased toward the reed switch by the fluid flow rate in the communicating tube; and the pivot arm and the magnetic block are pivoted away from the reed switch when the fluid flow rate in the communicating tube drops below the predetermined value, thereby causing the reed switch to change from one state to a different state.

In some embodiments, the water pump employs a DC brushless motor.

In some embodiments, the filtering device further comprises a first sealing ring for sealing between the communicating tube and the water pump; and a second sealing ring for sealing between the communicating tube and the filter cartridge.

In some embodiments, the filtering device also comprises a base defining a recess, and the water pump and the filter cartridge are mounted in the recess of the base.

In some embodiments, the filtering device also comprises a cover disposed on the base and enclosing the water pump.

In some embodiments, the filtering device also comprises a water inlet connected to the water pump and a water outlet connected to the filter cartridge; and the filtering device is configured to provide a fluid flow from the water inlet through the water pump, the filter cartridge, and then the water outlet.

In some embodiments, the water inlet and the water outlet are each adapted to be connected to a pool body of a swimming pool.

In accordance with various embodiments of the present disclosure, a control system for a filtering device is provided. The control system comprises a control panel for the filtering device; a central control system; and a filtration detecting system. The control panel for the filtering device is electrically connected to the central control system and adapted to control the central control system; the central control system is electrically connected to the filtration detecting system and adapted to control the filtration detecting system; and the filtration detecting system causes the reminding device to generate a first reminder signal in response to the flow switch detecting the fluid flow rate in the communicating tube being less than the predetermined value.

In some embodiments, the control system further comprises an air discharge detecting system and a dry-run detecting system. The central control system is electrically connected to the air discharge detecting system and the dry-run detecting system, and the central control system is adapted to control the air discharge detecting system and the dry-run detecting system; and the dry-run detecting system causes the reminding device to generate a second reminder signal in response to an operating current of the water pump being less than a first predetermined current for a predetermined duration of time, and with the air discharge detecting system determining that an air discharge valve is open.

In some embodiments, the dry-run detecting system causes the reminding device to generate the second reminder signal in response to the operating current of the water pump being less than 0.5 amperes for a duration of 1 minute, and with the air discharge detecting system determining that the air discharge valve is open.

In some embodiments, the control system further comprises a remote control system configured to remotely control the central control system.

In some embodiments, the control system further comprises a locked-rotor detecting system. The central control system is electrically connected to the locked-rotor detecting system and adapted to control the locked-rotor detecting system; and the locked-rotor detecting system causes the reminding device to generate a third reminder signal in response to the operating current of the water pump being greater than a second predetermined current.

In some embodiments the locked-rotor detecting system causes the reminding device to generate the third reminder signal in response to the operating current of the water pump being greater than 2 amperes.

BRIEF DESCRIPTION OF THE DRAWINGS

To understand the present disclosure, it will now be described by way of example, with reference to the accompanying drawings in which implementations of the disclosure are illustrated and, together with the description below, serve to explain the principles of the disclosure.

DETAILED DESCRIPTION

The present disclosure provides exemplary embodiments of a filtering device. The exemplary embodiments of the present disclosure are described below with reference to the drawings for illustration. It should be understood that the description about the exemplary embodiments should be considered as mere illustrations of the structures and principles of the present invention, and the present invention is not limited to the exemplary embodiments. The present invention may be incorporated in any type or form of filtering device, including, but not limited to filtering devices for pools or hot tubs, or any other desired filtering device. The filtering device of the present disclosure includes improvements over conventional filtering devices.

The drawings show a filtering device according to the present disclosure. The filtering device, illustrated in the accompanying drawings and discussed with respect thereto, is suitable for performing the filtering operation for various pools including above-ground pools. Moreover, this filtering device can be applied not only to pools, and but also to other fields for performing filtering operation on fluids in other apparatuses. The following description is made by taking the filtering device applied to an above-ground pool, as merely an example of a suitable environment for use of same.

Figure 7A:
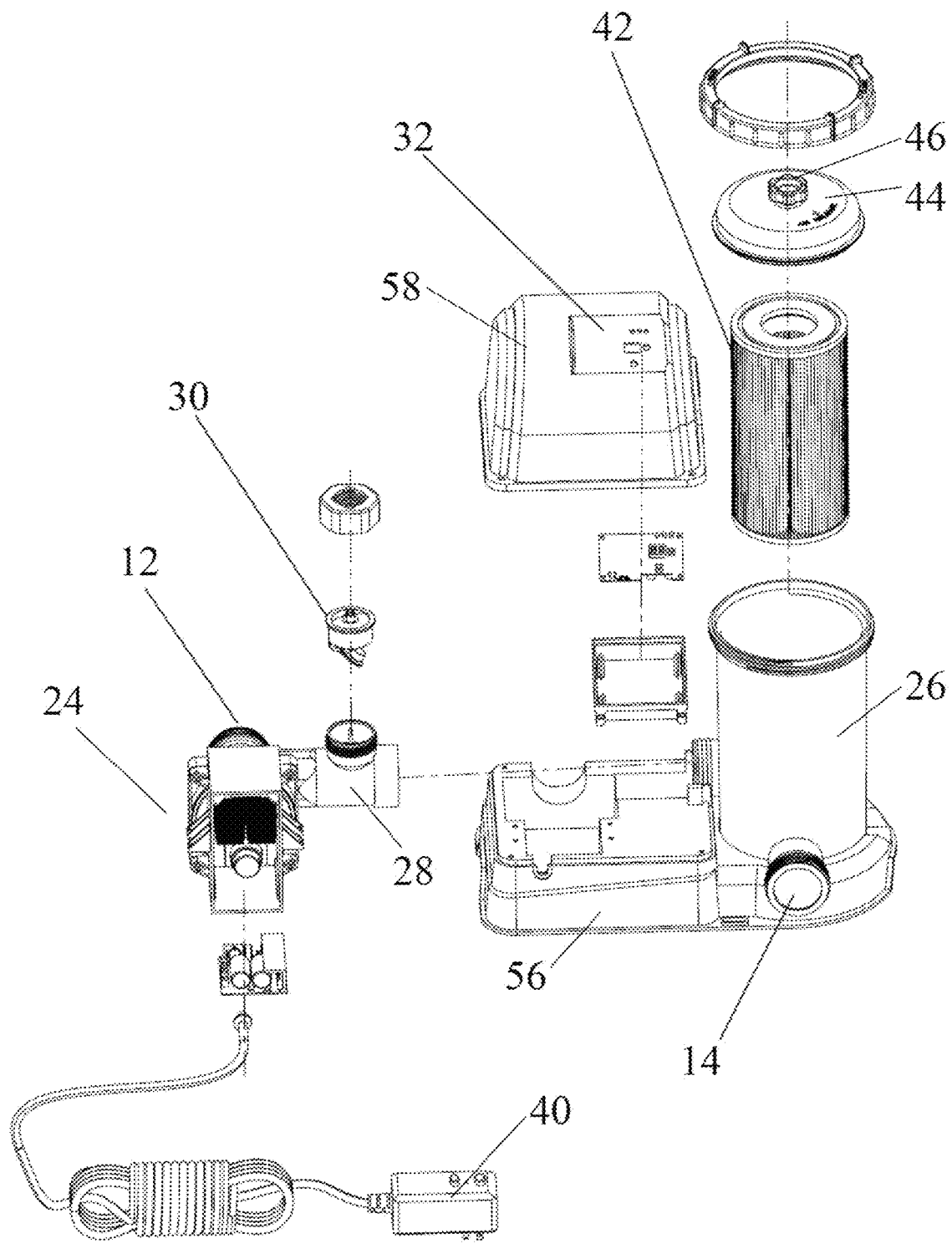
FIG. 7A is an exploded view of the filtering device, according to embodiments of the present disclosure.
Figure 7B:
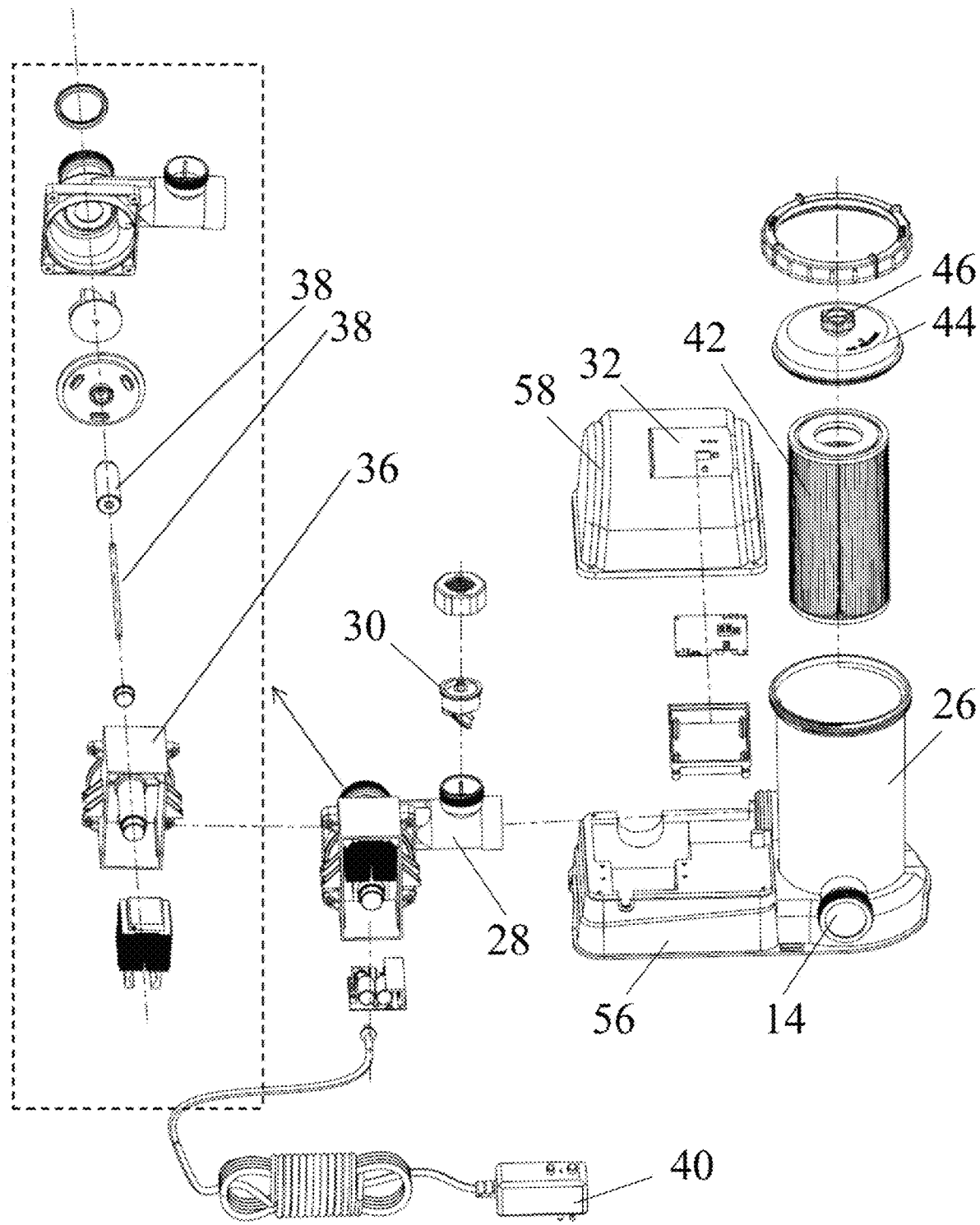
FIG. 7B is an exploded view of the filtering device of FIG. 7A, with an exploded view of the water pump.
Figure 8:
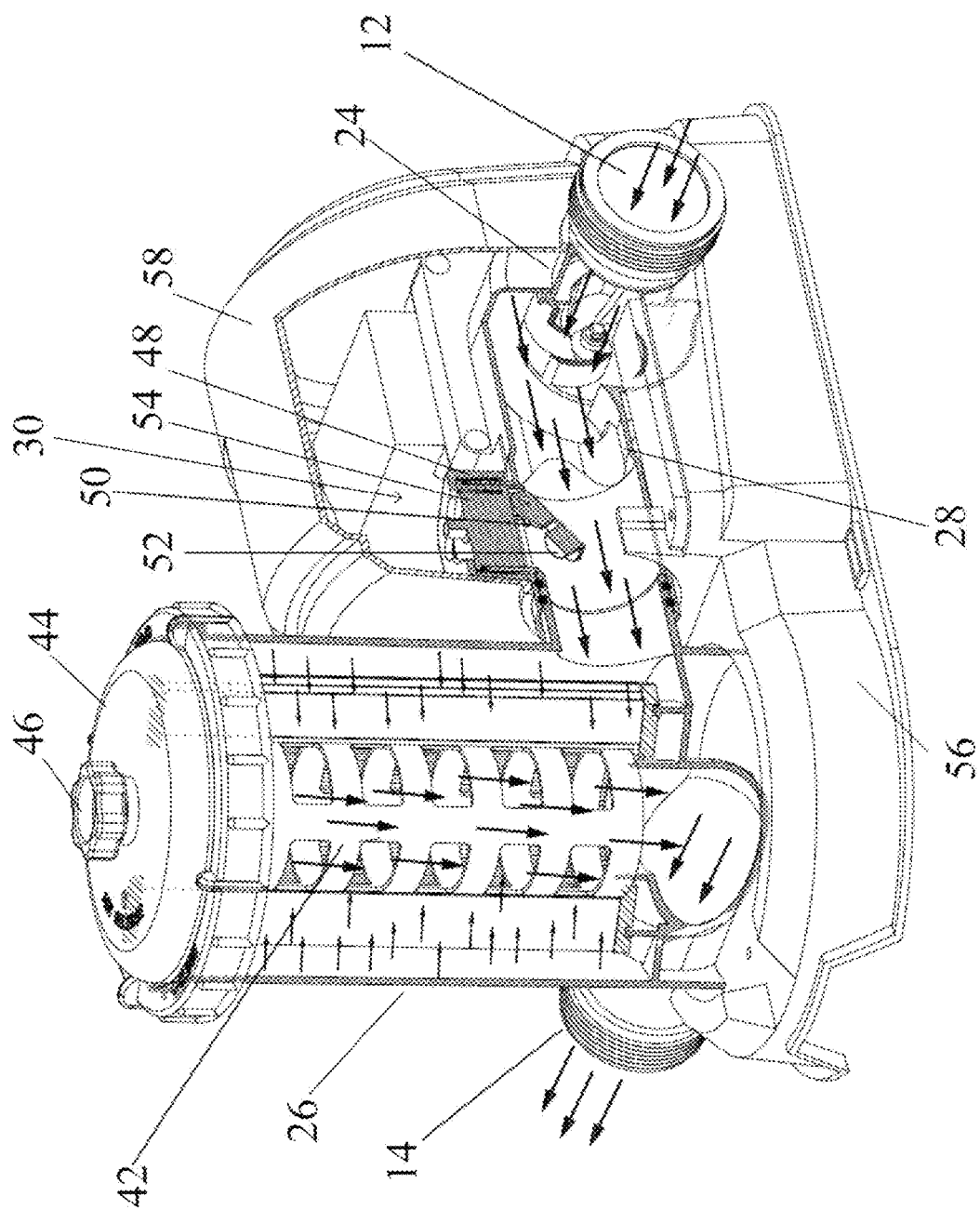
FIG. 8 is a sectional view of the filtering device, according to embodiments of the present disclosure, showing a flow path through the filtering device.
Figure 9:
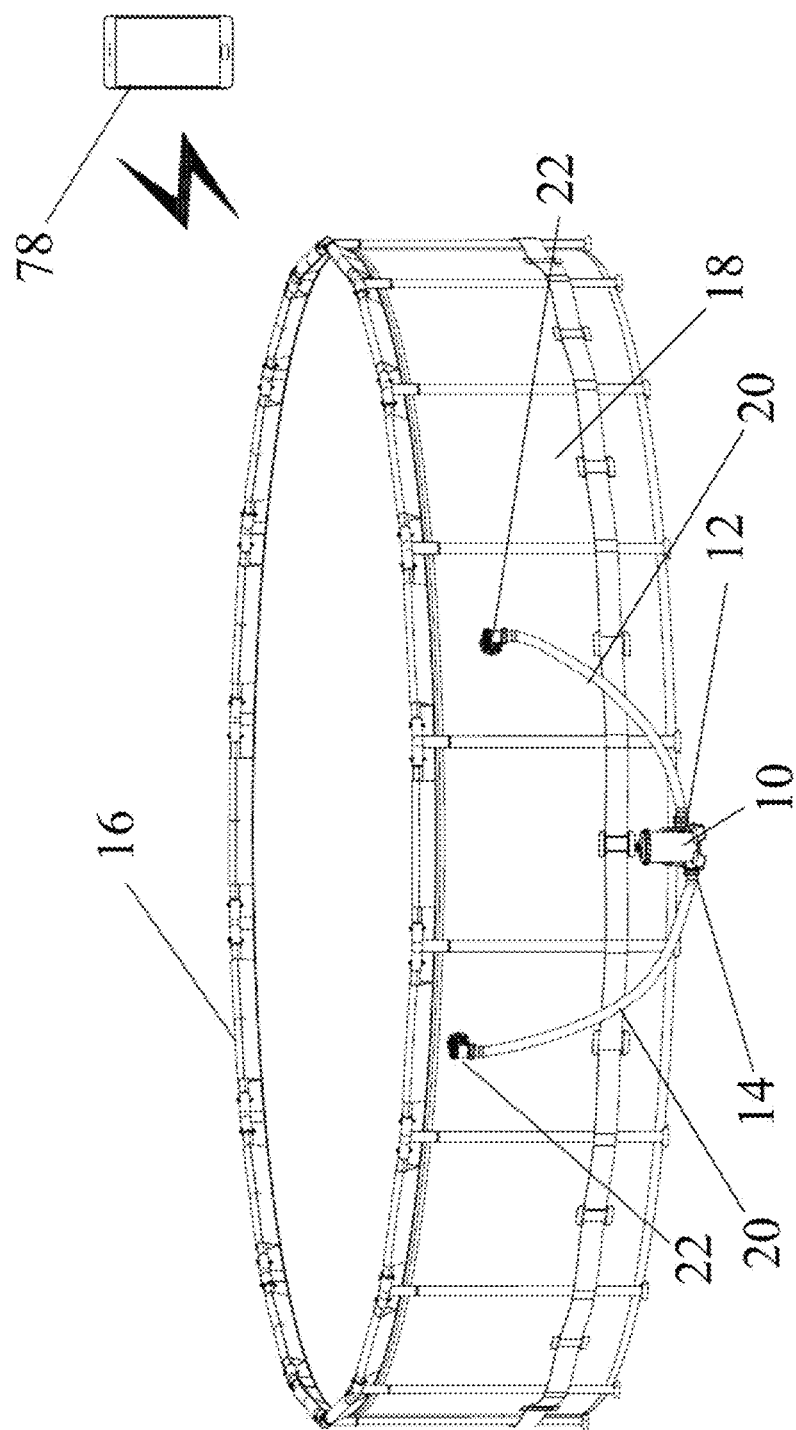
FIG. 9 shows the filtering device connected to an above-ground pool, according to embodiments of the present disclosure.

FIGS. 1-6 respectively illustrate various views of a filtering device 10, according to embodiments of the present disclosure. FIGS. 7A and 7B, respectively, illustrate an exploded view of the filtering device 10 and an exploded view of the water pump of the filtering device 10, according to embodiments of the present disclosure. FIG. 8 illustrates a sectional view of the filtering device 10, according to embodiments of the present disclosure, showing a flow path through the filtering device 10. FIG. 9 shows the filtering device 10 connected to an above-ground pool 16, according to embodiments of the present disclosure.

Figure 1:
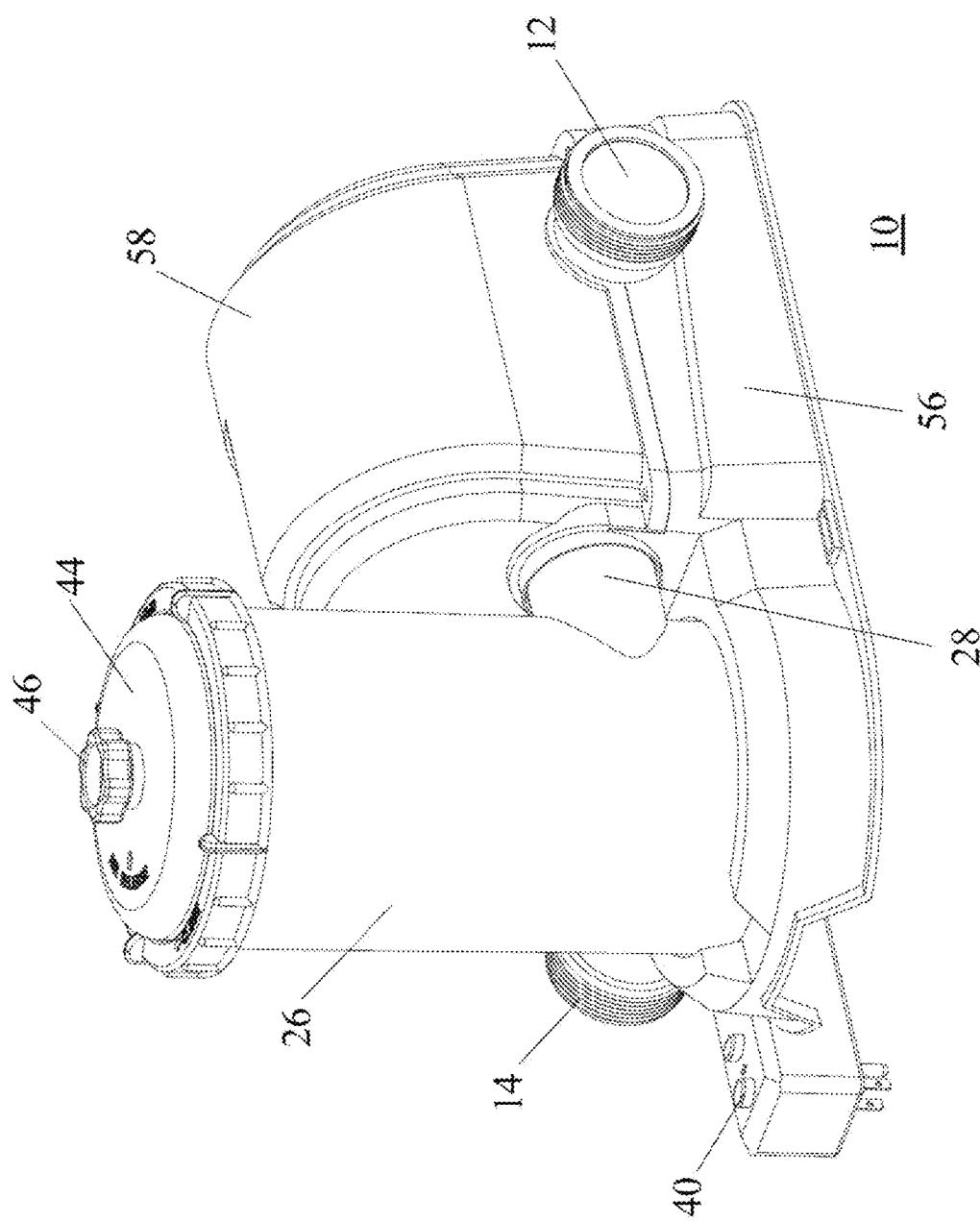
FIG. 1 is a perspective view of a filtering device, according to embodiments of the present disclosure.
Figure 2:
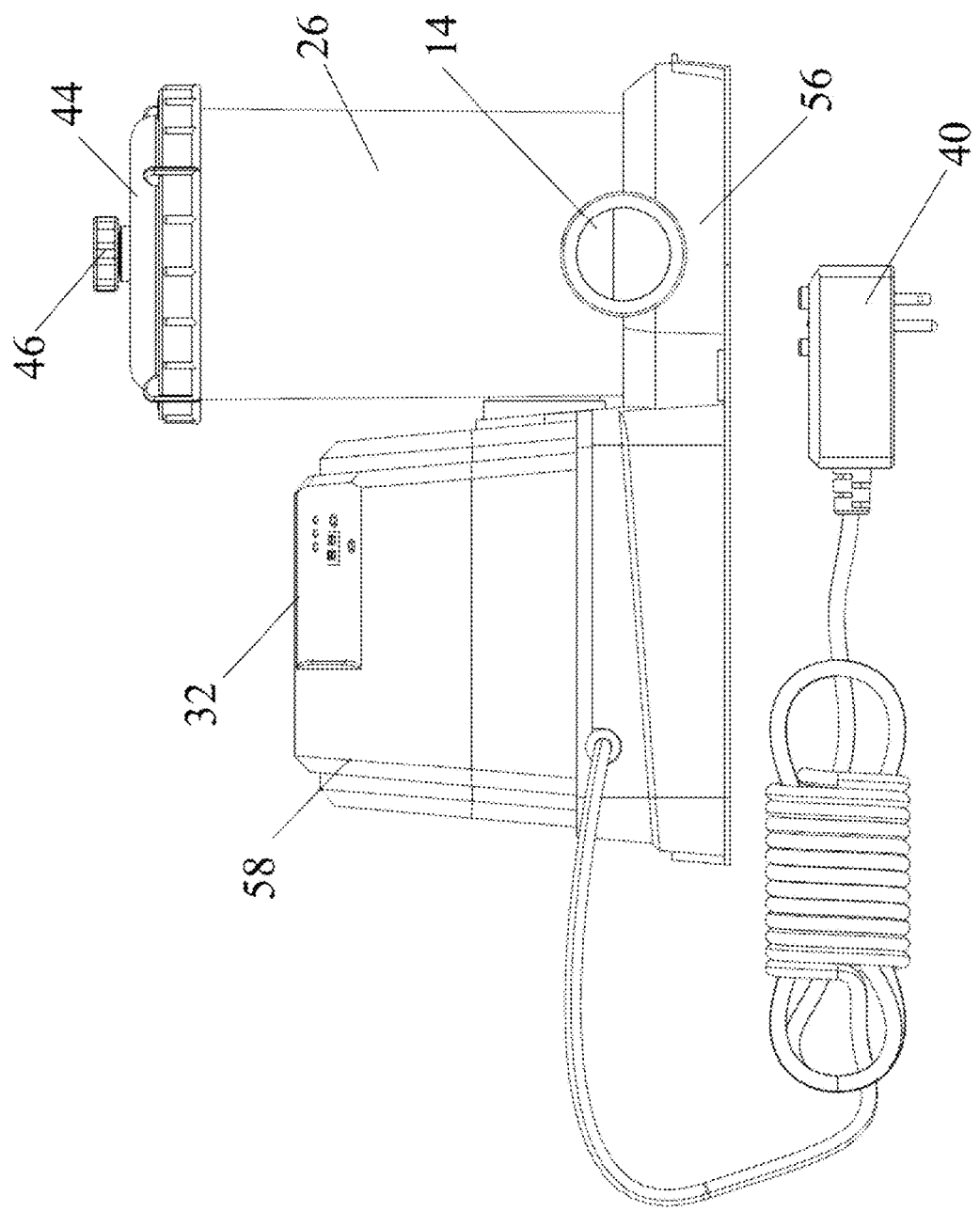
FIG. 2 is a front view of the filtering device, according to embodiments of the present disclosure.
Figure 3:
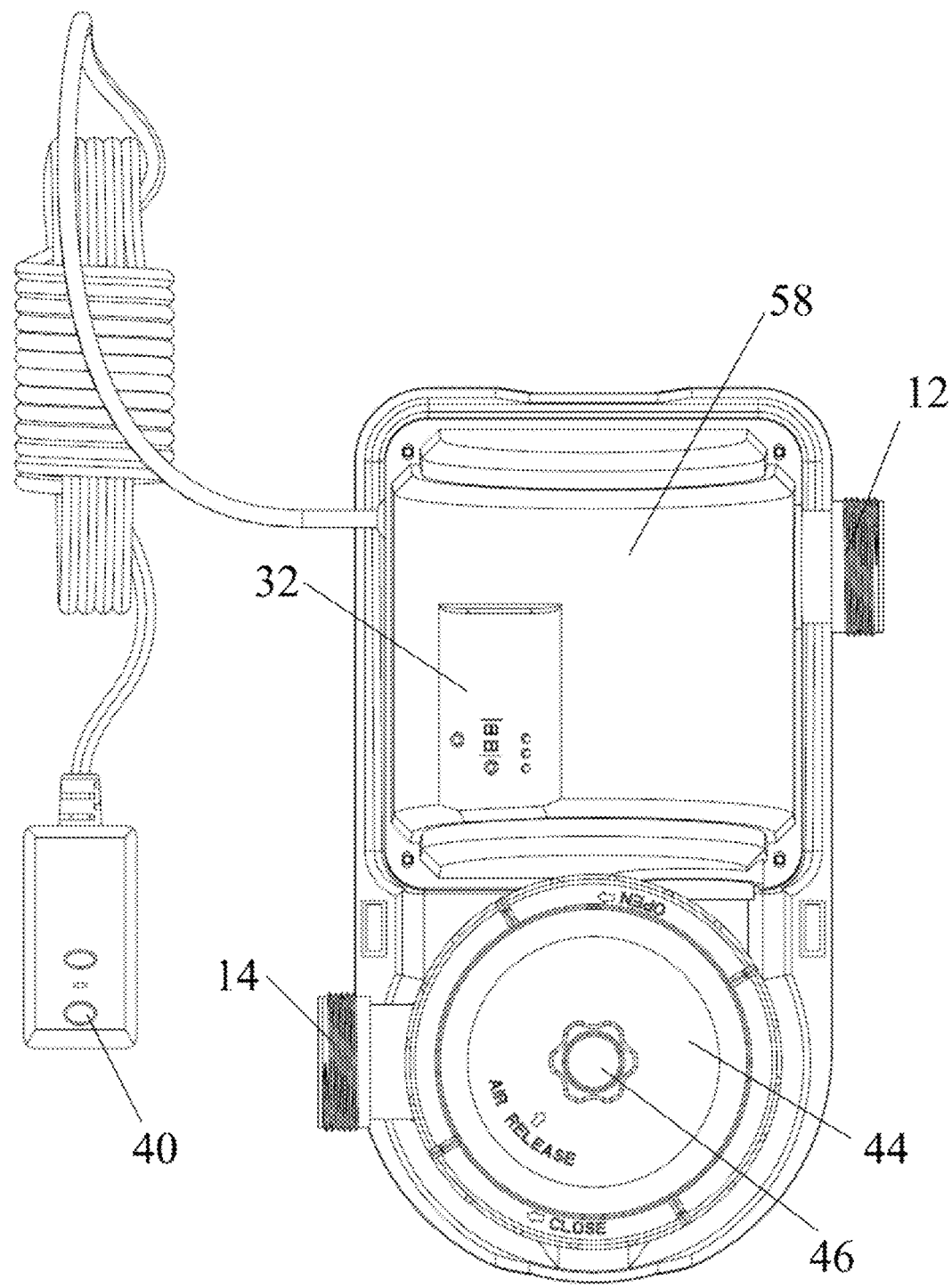
FIG. 3 is a top view of the filtering device, according to embodiments of the present disclosure.
Figure 4:
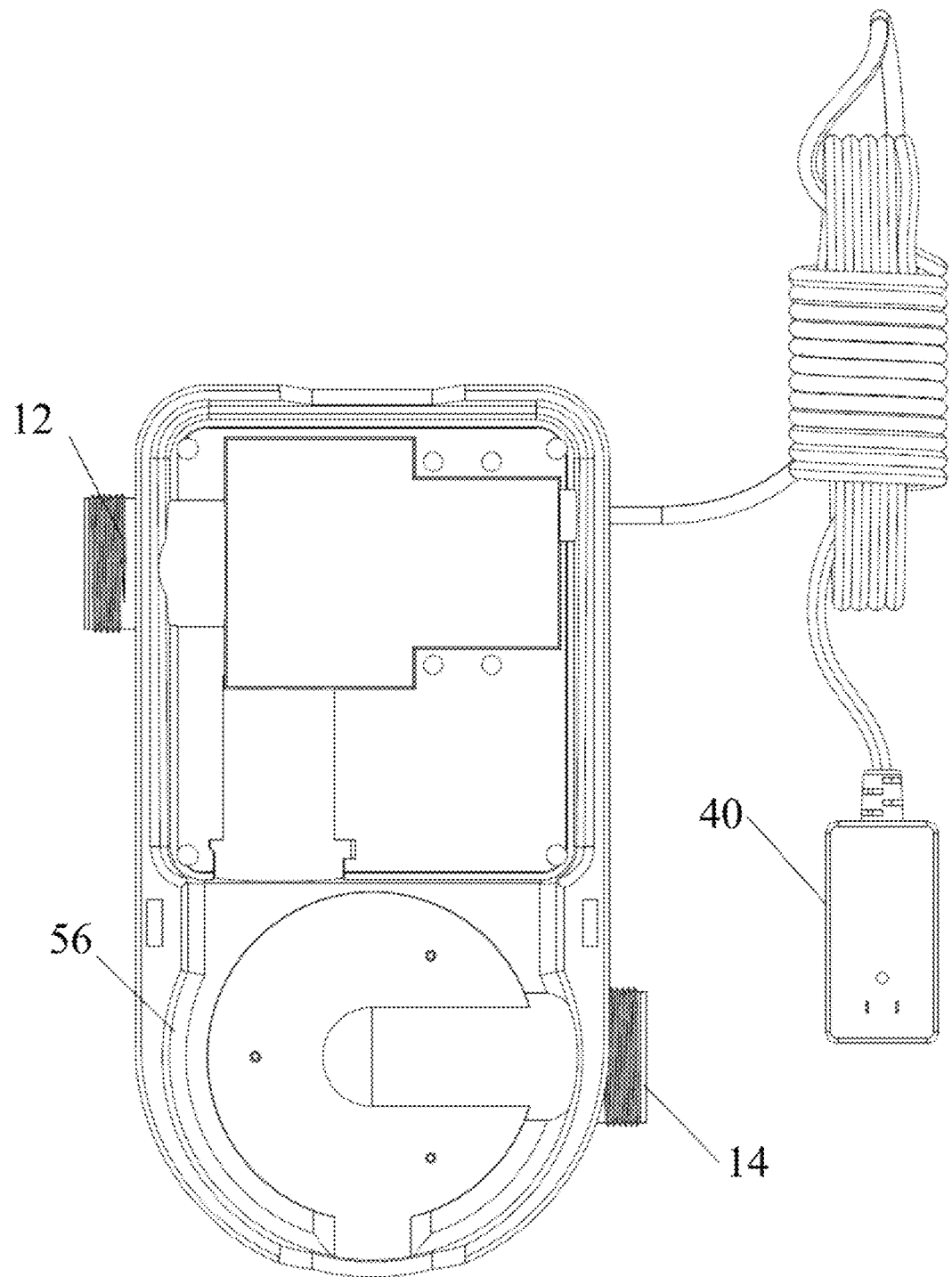
FIG. 4 is a bottom view of the filtering device, according to embodiments of the present disclosure.
Figure 5:
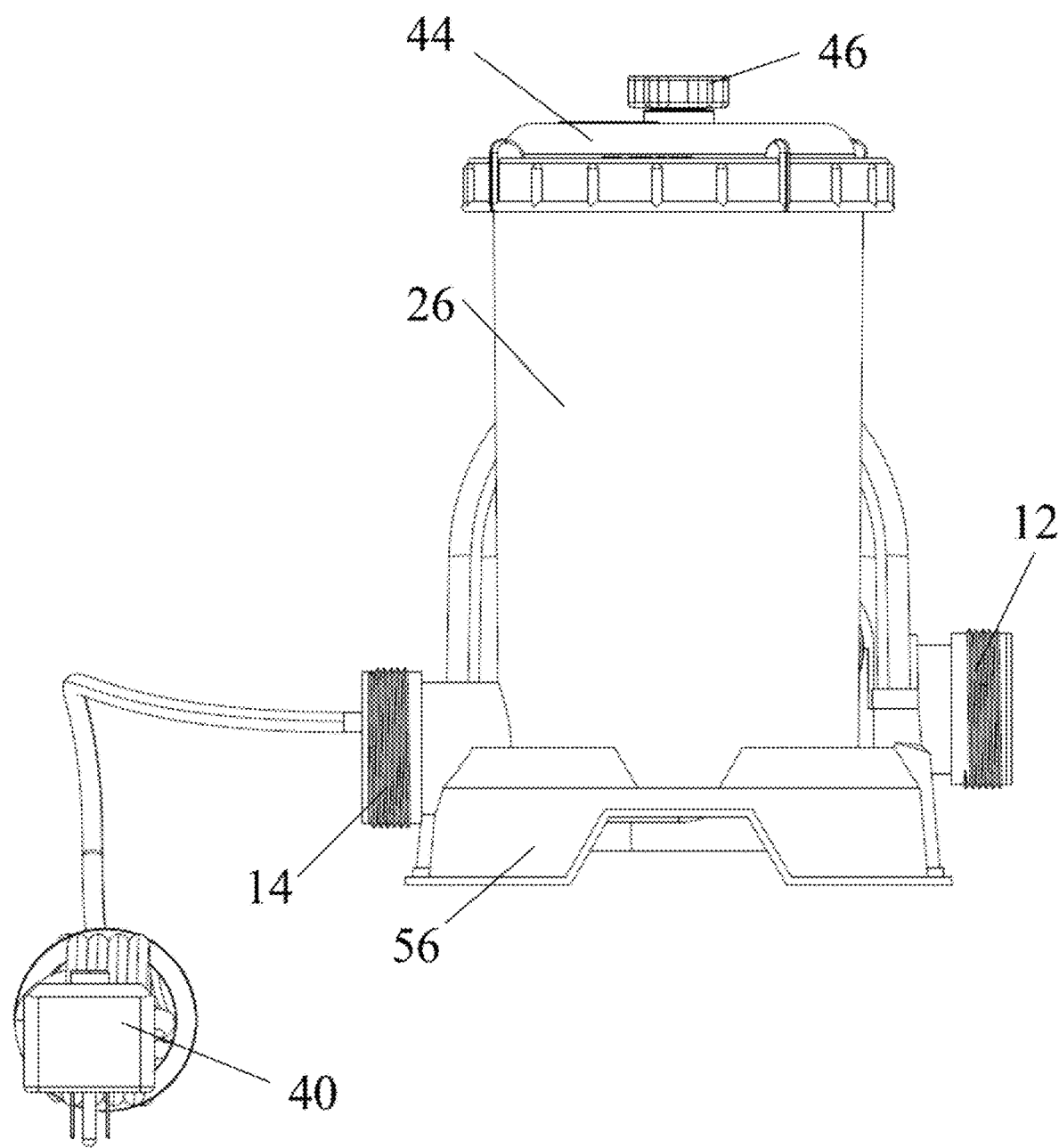
FIG. 5 is a side view of the filtering device, according to embodiments of the present disclosure.
Figure 6:
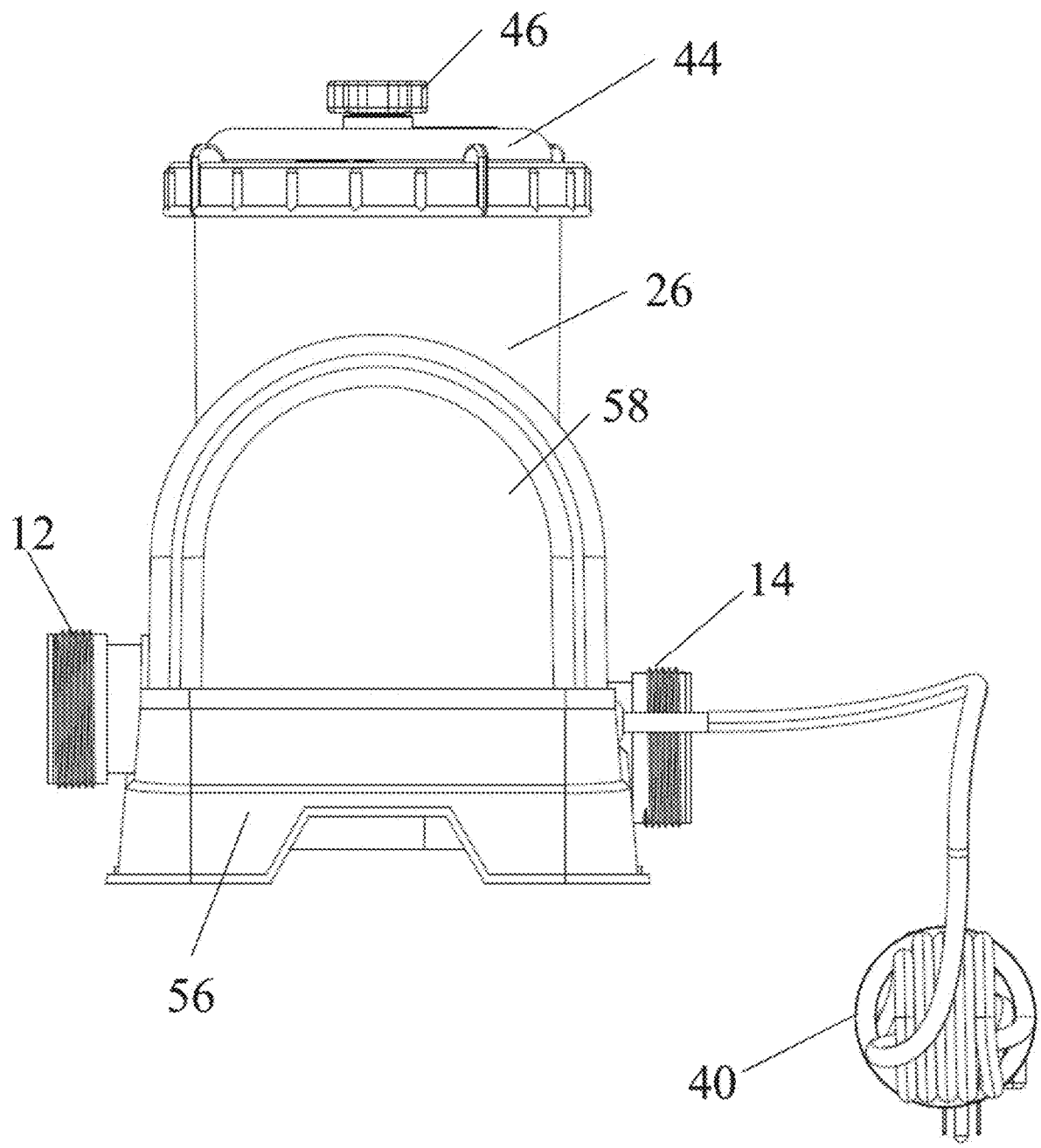
FIG. 6 is a side view of the filtering device, according to embodiments of the present disclosure.

In some embodiments, and as shown in FIGS. 1 and 9, the filtering device 10 includes a water inlet 12 and a water outlet 14, which are respectively connected to the pool body 18 of the above-ground pool 16. Specifically, as shown in FIG. 9, the water inlet 12 and the water outlet 14 of the filtering device 10 are connected to the pool body 18 of the above-ground pool 16 via water pipes 20 and water valves 22. The water to be filtered from the above-ground pool 16 flows into the filtering device 10 through the water inlet 12. After the water is filtered by the filtering device 10, the filtered water flows back to the above-ground pool 16 through the water outlet 14. With the operation of the filtering device 10, the water in the above-ground pool 16 continuously flows into the filtering device 10 through the water inlet 12 and flows back to the above-ground pool 16 through the water outlet 14, after filtered, thereby realizing the filtration of the water in the above-ground pool 16. Thus, water in the above-ground pool 16 is recycled and not wasted.

In some embodiments, and as shown in FIGS. 7A and 7B, the filtering device 10 includes a water pump 24, a filter cartridge 26, a communicating tube 28 coupling the water pump 24 with the filter cartridge 26, and a water flow switch 30 attached to the communicating tube 28. The state of the water flow switch 30 is switched when the flow rate of the water in the communicating tube 28 is lower than a predetermined value. The filtering device 10 further includes a reminding device 32. The water flow switch 30 is connected to the reminding device 32. The reminding device 32 generates a first reminder signal when the state of the water flow switch 30 is switched as the flow rate of the water in the communicating tube 28 is lower than the predetermined value.

In some embodiments, and as shown in FIG. 7A, the water pump 24 is connected to the water inlet 12 to pump the water (which flows into the filtering device 10 from the above-ground pool 16 through the water inlet 12) into the filter cartridge 26. As shown in FIG. 7B, the water pump 24 employs a DC (direct current) brushless motor as a power source, and the DC brushless motor includes a stator 36 and a rotor 38. The DC brushless motor operates by converting AC (alternating current) from an external power source to DC through a PCB (printed circuit board). The employment of the DC brushless motor can improve energy efficiency and reduce noise, and can provide safe dry-run protection and locked-rotor protection which can be intelligently controlled. It should be understood that the water pump may also be a conventional squirrel-cage induction water pump or an AC permanent magnet synchronous water pump. The DC brushless motor is connected to the external power source via an adapter 40. The filter core 42 is disposed inside the filter cartridge 26, and the filter cartridge 26 filters the water by means of the filter core 42. Dirt and other particulates are removed from the water by the filter core 42, thereby staying in the filter cartridge 26. The filtered water flows back to the above-ground pool 16 through the water outlet 14 connected to the filter cartridge 26. The filter cartridge 26 and the filter core 42 may be any commercially available filter cartridge and filter core, and as such, will not be described in detail herein. The flow path of water within the filtering device 10 can be seen in FIG. 8. Further, as shown in FIGS. 7A and 7B, the filter cartridge 26 further includes a lid 44 and an air discharge valve 46 disposed on the lid 44. The lid 44, including the air discharge valve 46, may be of any conventional and commercially available design, and therefore, will not be described in detail herein.

As shown in FIG. 7A, the communicating tube 28 is disposed between the water pump 24 and the filter cartridge 26 for coupling the water pump 24 and the filter cartridge 26 such that the water pumped by the water pump 24 is delivered to the filter cartridge 26 through the communicating tube 28. The communicating tube 28 has a short length to reduce resistance to water flow and increase the flow rate of the water. Further, in order to avoid water leakage and/or air intrusion, a first sealing ring (not shown) is disposed between the communicating tube 28 and the water pump 24 for sealing therebetween. Similarly, a second sealing ring (not shown) is disposed between the communicating tube 28 and the filter cartridge 26 for sealing therebetween.

In some embodiments, and as shown in FIG. 7A, the water flow switch 30 is attached to the communicating tube 28 and can be switched when the flow rate of the water in the communicating tube 28 is lower than the predetermined value. The water flow switch 30 can be switched from the closed state to the open state when the flow rate of the water in the communicating tube 28 drops below the predetermined value. Examples of the flow rate of the water being lower than the predetermined value are as follows: in the case of a filtering pump with an actual flow rate of 1500 gallons/hour, the flow rate of the water decreases by 500 gallons/hour; in the case of a filtering pump with an actual flow rate of 1500 gallons/hour, the flow rate of the water decreases by 30%~50% after the filter core gets dirty; in the case of a filtering pump with an actual flow rate of 1500 gallons/hour, the flow rate of the water decreases to 1000 gallons/hour after the filter core gets dirty. It should be understood that these examples are merely illustrative and not restrictive.

In some embodiments, and as shown in FIG. 8, the water flow switch 30 includes a housing 48, a pivot arm 50, a magnetic block 52, and a reed switch 54. The housing 48 is disposed on a wall of the communicating tube 28. The pivot arm 50 is pivotally connected to the housing 48 and is pivotable from the inside of the communicating tube 28 to the inside of the housing 48 or from the inside of the housing 48 to the inside of communicating tube 28. The magnetic block 52 is disposed at an end of the pivot arm 50. The reed switch 54 is disposed inside the housing 48. The pivot arm 50 is provided such that the pivot arm 50 is able to be biased toward the reed switch 54 when forced by the water flow in the communicating tube 28. When the flow rate of the water in the communicating tube 28 is lower than the predetermined value, the pivot arm 50 and the magnetic block 52 disposed at the end of the pivot arm 50 are pivoted away from the reed switch 54. And since the magnetic block 52 is then away from the reed switch 54, the reed switch 54 is switched from a closed state to an open state.

A spring, such as a torsion spring, may be disposed between the pivot arm 50 and the housing 48 to provide a biasing force for biasing the pivot arm 50 relative to the housing 48, so as to bias the pivot arm 50 relative to the housing 48 from the inside of the housing 48 to the inside of the communicating tube 28. When the filtering device 10 is in a normal operating state (i.e., there is no or substantially no filtered-out dirt in the filter cartridge 26 of the filtering device 10), the filtering operation of the filter cartridge 26 poses less obstruction to the water flow, and the flow rate of the water in the communicating tube 28 is high. In this case, the water flow applies an urging force to the pivot arm 50. The urging force overcomes the biasing force applied to the pivot arm 50 by the torsion spring such that the pivot arm 50 is pivoted to the inside of the housing 48. As a result, the magnetic block 52 disposed at the end of the pivot arm 50 is close to or even in close contact with the reed switch 54 disposed inside the housing 48. Under the effect of the magnetic field generated by the magnetic block 52, the reed switch 54 is in the closed state. That is, at this time, the water flow switch 30 is in the closed state. As the filtering operation goes on, more and more dirt is accumulated inside the filter cartridge 26 of the filtering device 10, and the filtering operation of the filter cartridge 26 poses increasing obstruction to the water flow, so that the flow rate of the water in the communicating tube 28 is gradually decreased. Thereby, the urging force applied to the pivot arm 50 by the water flow is gradually reduced, and the pivot arm 50 is gradually pivoted from the inside of the housing 48 toward the inside of the communicating tube 28 under the effect of the biasing force applied by the torsion spring. Accordingly, the magnetic block 52 disposed at the end of the pivot arm 50 is gradually moved away from the reed switch 54 disposed inside the housing 48. Therefore, the magnetic field generated by the magnetic block 52 has an increasingly weak effect on the reed switch 54. When the flow rate of the water in the communicating tube 28 is lower than the predetermined value, the pivot arm 50 and the magnetic block 52 are pivoted away from the reed switch 54 such that the reed switch 54 is switched from the closed state to the open state (that is, the water flow switch 30 is switched from the closed state to the open state).

Based on the change in the states of the water flow switch 30, the reminding device 32 connected to the water flow switch 30 generates a first reminder signal for reminding the user to clean or replace the filter cartridge 26 or the filter core 42. It should be understood that the flow rate causing the water flow switch 30 to change switching state can be controlled by setting, for example, the biasing force applied by the torsion spring. That is to say, a reasonable timing of cleaning or replacing the filter cartridge 26 or the filter core 42 can be set, thereby maintaining the cleaning or replacing of the filter cartridge 26 or the filter core 42 at an optimum timing.

In some embodiments, and as shown in FIG. 7A, the reminding device 32 is a display device. The reminder signals are indicated by the display device. The reminder signals may drive, for example, a continuous indicating-light or a text reminder. It should be understood that the reminding device 32 may also comprise a sound generating device. In this case, the reminder signals may be used to generate a sound to inform the user of the related condition. The reminding device 32 may also include a communication module. The communication module, for example, can send a reminder signal to an application on the user's mobile phone. For example, FIG. 9 illustrates a mobile phone 78 that can communicate with the filtering device 10.

In some embodiments, and as also shown in FIG. 7A, the filtering device 10 further includes a recess-shaped base 56, and the water pump 24 and the filter cartridge 26 are, respectively, fixedly mounted in the recesses of the base 56. The base 56 allows the water pump 24, the filter cartridge 26, the communicating tube 28 and the water flow switch 30 to be steadily mounted, and allows the entire filtering device 10 to be steadily disposed for example, on the ground. As shown in FIG. 7A, the filtering device 10 further includes a cover 58. The cover 58 is disposed outside of the water pump 24 and disposed on the base 56. The cover 58 encloses the water pump 24 and some other components for protection. The cover 58 can increase the safety in using the filtering device 10. As shown in FIG. 7A, the reminding device 32, in the form of the display device, is disposed on the cover 58.

Figure 10:
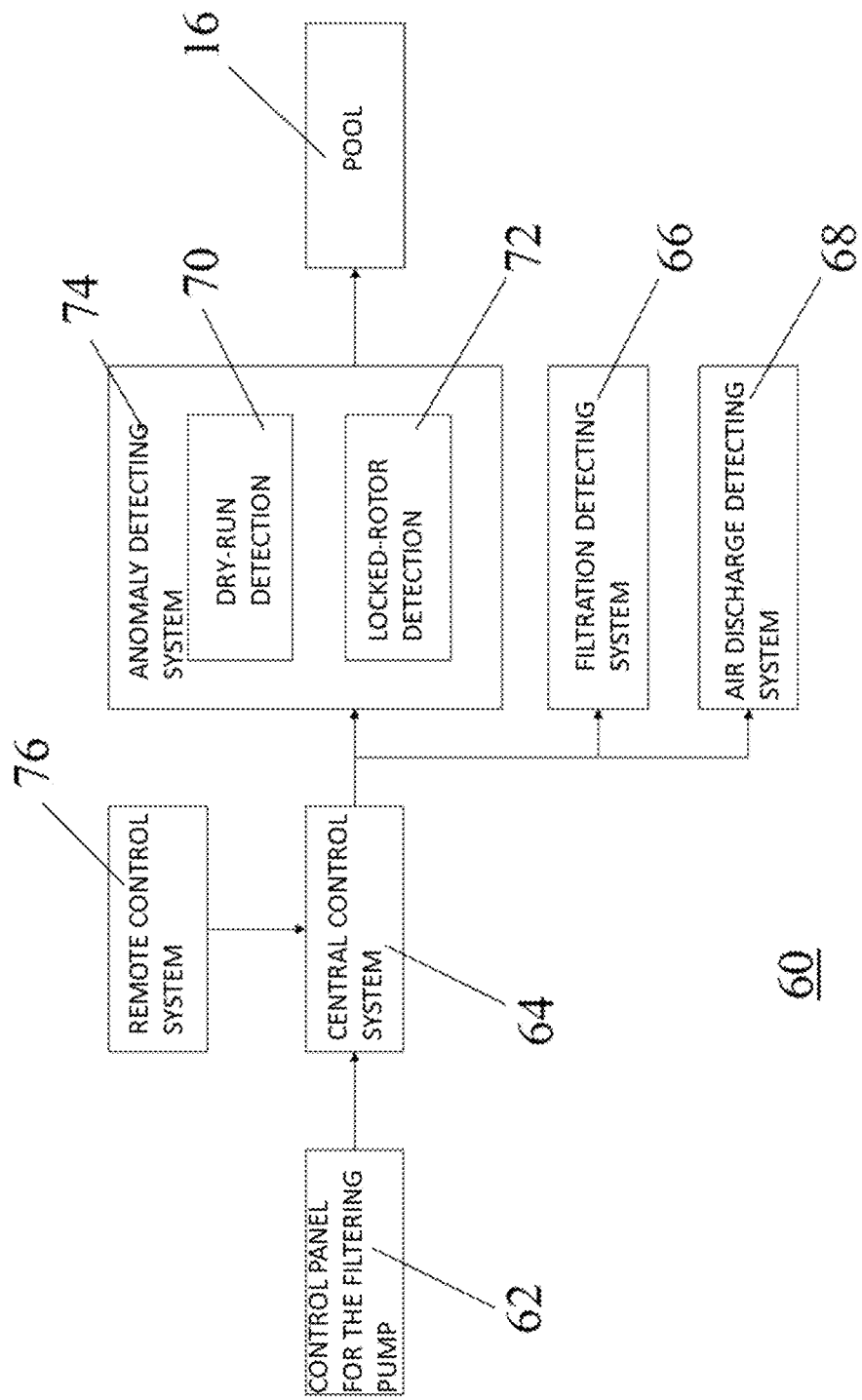
FIG. 10 is a block diagram of a control system for a filtering device, according to embodiments of the present disclosure.

FIG. 10 illustrates a block diagram of the control system 60 of the filtering device 10, according to some embodiments of the present disclosure. As shown in FIG. 10, the control system 60 of the filtering device 10 includes a control panel for the filtering pump 62, a central control system 64, and a filtration detecting system 66. The control panel for the filtering pump 62 is electrically connected to the central control system 64 and is suitable for controlling the central control system 64. The central control system 64 is electrically connected to the filtration detecting system 66 and is suitable for controlling the filtration detecting system 66. When the filtration detecting system 66 detects, via the water flow switch 30, that the flow rate of the water in the communicating tube 28 is lower than the predetermined value, the filtration detecting system 66 causes the reminding device 32 to generate the first reminder signal.

Specifically, the switching state of the water flow switch 30 can be switched when the flow rate of the water in the communicating tube 28 is lower than the predetermined value, and the water flow switch 30 is connected to the reminding device 32. The reminding device 32 generates the first reminder signal when the switching state of the water flow switch 30 indicates that the flow rate of the water in the communicating tube 28 is lower than the predetermined value.

Figure 13:
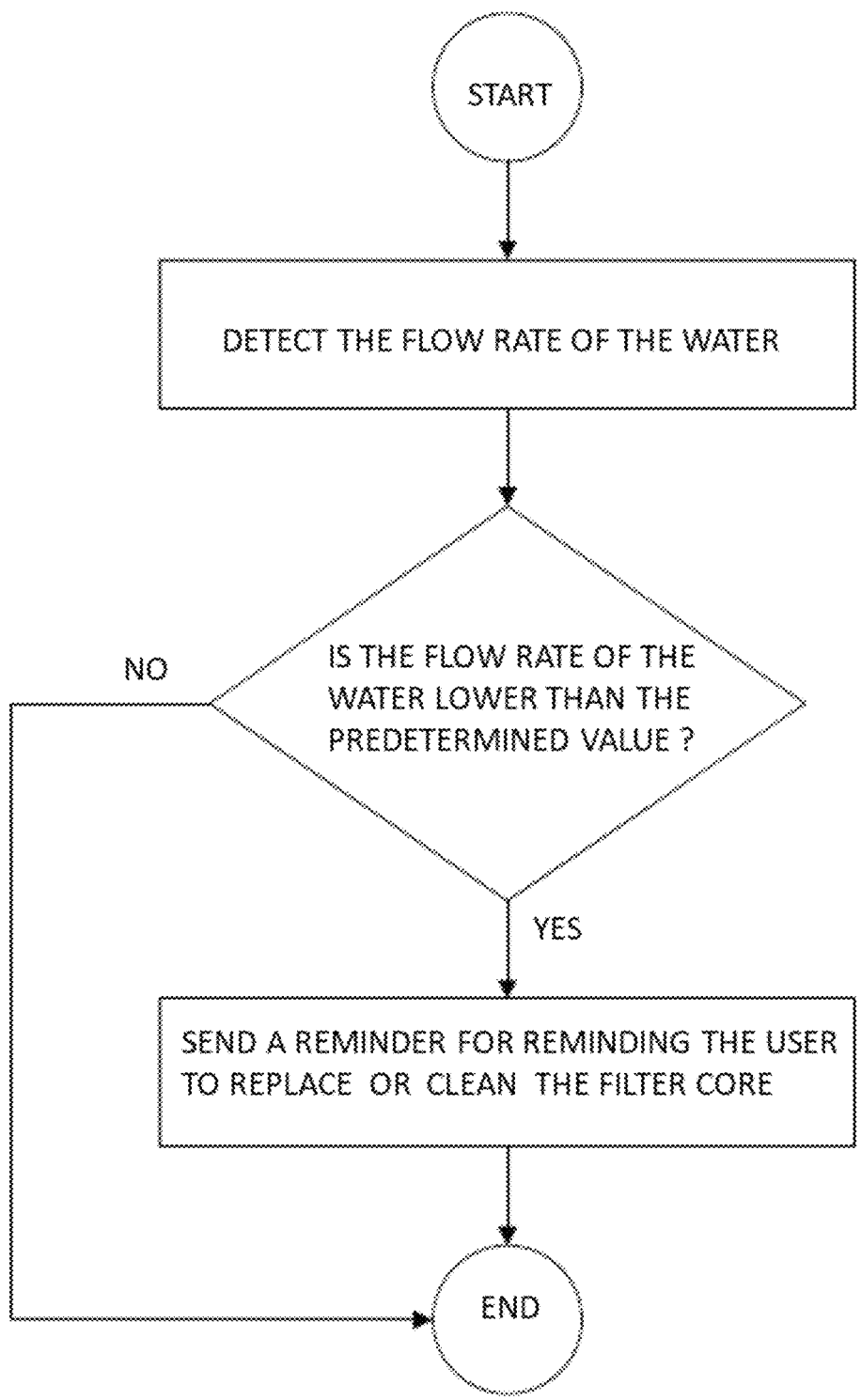
FIG. 13 is yet another flow diagram showing operation of the control system of the filtering device, according to embodiments of the present disclosure.

FIG. 13 illustrates a flow diagram describing operation of the filtration detecting system 66 of the control system 60 of the filtering device 10, according to some embodiments of the present disclosure. As shown in FIG. 13, the filtration detecting system 66 first detects the water flow in the communicating tube 28 and determines whether the flow rate of the water is lower than the predetermined value. If the filtration detecting system 66 determines that the flow rate of the water is lower than the predetermined value, the filtration detecting system 66 causes the reminding device 32 to generate the first reminder signal to remind the user to replace or clean the filter core 42. If the filtration detecting system 66 determines that the flow rate of the water is not lower than the predetermined value, the operation is terminated.

Referring back to FIG. 10, the control system 60 further includes an air discharge detecting system 68 and a dry-run detecting system 70. The central control system 64 is electrically connected to the air discharge detecting system 68 and the dry-run detecting system 70 and is suitable for controlling the air discharge detecting system 68 and the dry-run detecting system 70. In the case where the operating current of the water pump 24 is less than a predetermined current for a predetermined duration of time, when the air discharge detecting system 68 determines that the air discharge valve 46 has been opened, the dry-run detecting system 70 causes the reminding device 32 to generate a second reminder signal. For example, the dry-run detecting system 70 may cause the reminding device 32 to generate the second reminder signal in response to the operating current of the water pump 24 being less than 0.5 amperes for a duration of 1 minute, and when the air discharge detecting system 68 also determines that the air discharge valve 46 has been opened.

Figure 11:
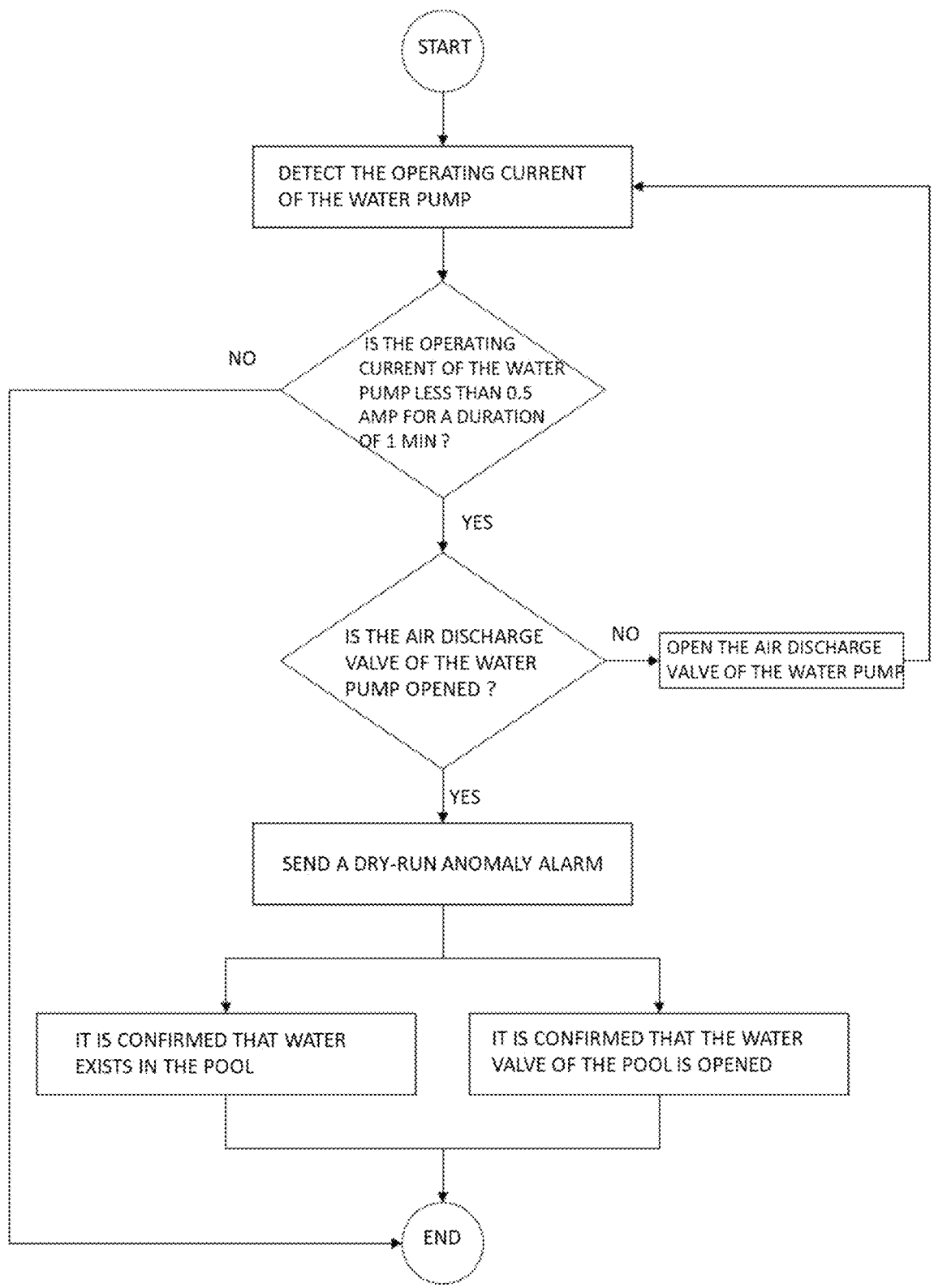
FIG. 11 is a flow diagram showing operation of the control system of the filtering device, according to embodiments of the present disclosure.

FIG. 11 illustrates a flow diagram describing operation of the air discharge detecting system 68 and the dry-run detecting system 70 of the control system 60 of the filtering device 10, according to some embodiments of the present disclosure. As shown in FIG. 11, the air discharge detecting system 68 first detects the operating current of water pump 24. If the air discharge detecting system 68 detects that the operating current of the water pump 24 is less than 0.5 amperes for a duration of 1 minute, it is further determined whether the air discharge valve 46 is opened. If the air discharge valve 46 has not been opened, the air discharge valve 46 will be opened and the air discharge detecting system 68 will returns to the state of detecting the operating current of the water pump 24. If the air discharge valve 46 is opened, the dry-run detecting system 70 causes the reminding device 32 to generate the second reminder signal, such as a dry-run anomaly alarm. If it is confirmed that water exists in the above-ground pool 16 and the water valve 22 of the above-ground pool 16 has been opened, the operation is terminated. In addition, if the air discharge detecting system 68 detects that the operating current of the water pump 24 does not satisfy the condition that the operating current is less than 0.5 amperes for a duration of 1 minute, the operation is terminated.

Referring back to FIG. 10, the control system 60 further includes a locked-rotor detecting system 72. The central control system 64 is electrically connected to the locked-rotor detecting system 72 and is suitable for controlling the locked-rotor detecting system 72. In the case where the operating current of the water pump 24 is greater than a predetermined current, the locked-rotor detecting system 72 causes the reminding device 32 to generate a third reminder signal. For example, the locked-rotor detecting system 72 may cause the reminding device 32 to generate the third reminder signal in response to the operating current of the water pump 24 being greater than 2 amperes.

Figure 12:
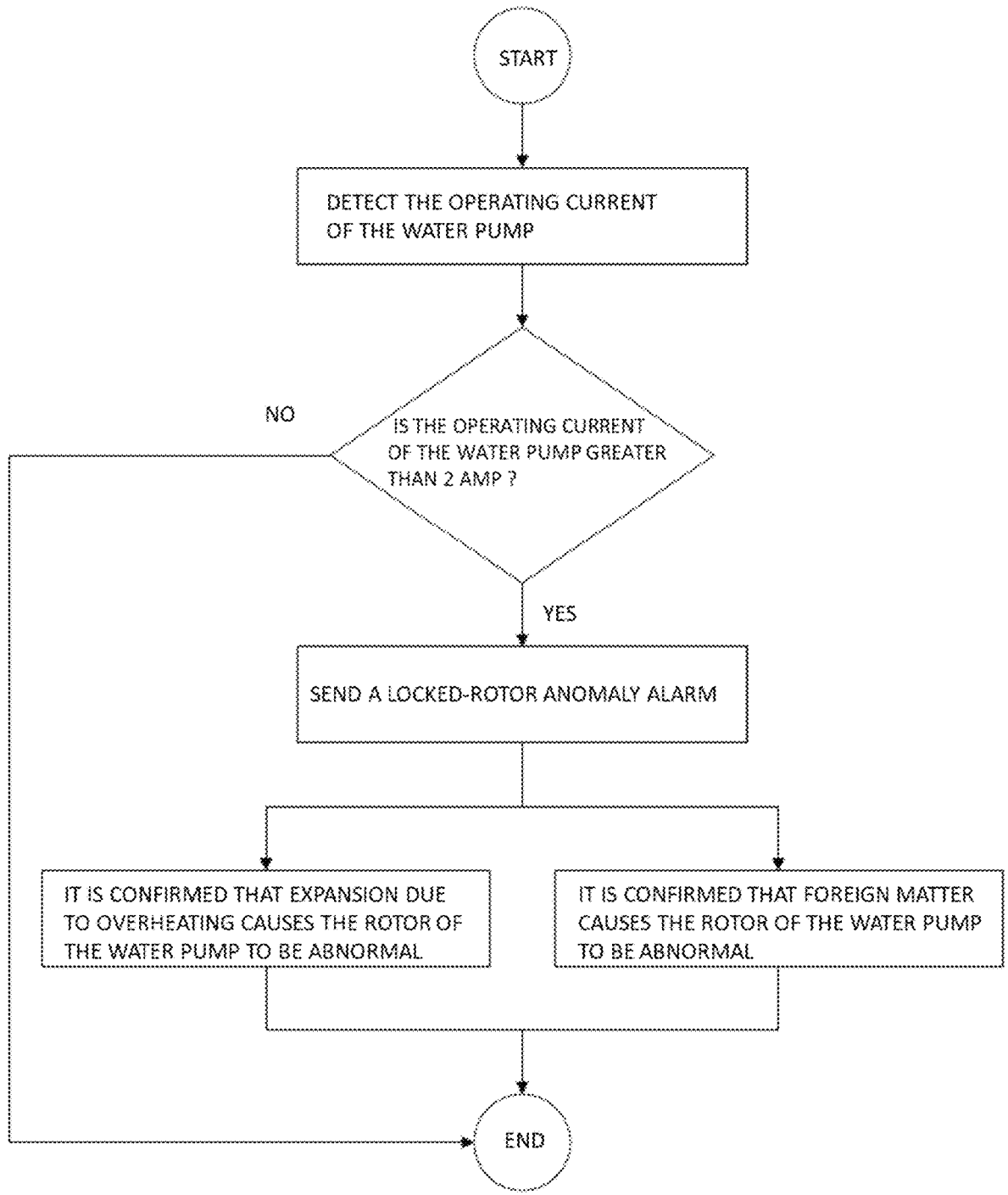
FIG. 12 is another flow diagram showing operation of the control system of the filtering device, according to embodiments of the present disclosure.

FIG. 12 illustrates a flow diagram describing operation of the locked-rotor detecting system 72 of the control system 60 of the filtering device 10, according to some embodiments of the present disclosure. As shown in FIG. 12, the locked-rotor detecting system 72 first detects the operating current of water pump 24. If the locked-rotor detecting system 72 detects that the operating current of the water pump 24 is greater than 2 amperes, the locked-rotor detecting system 72 causes the reminding device 32 to generate the third reminder signal, such as a locked-rotor anomaly alarm. If it is confirmed that expansion due to overheating causes the rotor 38 of the water pump 24 to be abnormal or foreign matter causes the rotor 38 of the water pump 24 to be abnormal, the operation is terminated. In addition, if the locked-rotor detecting system 72 detects that the operating current of the water pump 24 does not satisfy the condition that the operating current is greater than 2 amperes, the operation is terminated.

Referring back to FIG. 10, the dry-run detecting system 70 and the locked-rotor detecting system 72 constitute an anomaly detecting system 74. Since the anomaly detecting system 74 needs to know whether water exists in the pool and whether the water valve 22 is opened, the anomaly detecting system 74 is connected to the above-ground pool 16 as shown.

As also shown in FIG. 10, the control system 60 also includes a remote control system 76 suitable for remotely controlling the central control system 64. Thus, the central control system 64 can be remotely controlled. For example, the central control system 64 may be remotely controlled by a program or application (APP) on a mobile phone.

The filtering device and the control system of the present disclosure allow a user to determine whether the filter cartridge or the filter core needs to be cleaned or replaced, which can be determined according to the flow rate of the water. Thus, unnecessary maintenance on the filter cartridge or the filter core is avoided, and it is ensured that the filter cartridge or the filter core can be maintained in time to ensure good quality of the water in the pool.

Although some embodiments have been described by way of examples herein, various variations could be made to these embodiments without departing from the spirit of the present disclosure. All such variations belong to the conception of the present disclosure and fall within the scope of protection defined by the claims of the present disclosure. The specific embodiments disclosed herein are merely illustrative of the present disclosure. It would be apparent to those skilled in the art that various modifications could be made according to the teachings of the present disclosure and the present disclosure could be practiced in various equivalent ways. Thus, the particular embodiments of the present disclosure disclosed above are illustrative only, and the scope of protection of the present disclosure is not limited by the details of the structures or designs disclosed herein. Accordingly, various substitutions, combinations or modifications could be made to the particular exemplary embodiments disclosed above, and all variations thereof fall within the scope of the present disclosure. The filter device and control system exemplarily disclosed herein may also be suitably practiced in the absence of any element not specifically disclosed herein or in the absence of any optional components disclosed herein.

What is claimed is:

1. A filtering device, comprising:
a base including a first recess and a second recess;
a water pump mounted in the first recess of the base;
a filter cartridge mounted in the second recess of the base;
a communicating tube coupled to the water pump and the filter cartridge, and configured to provide fluid communication therebetween; and
a flow switch attached to the communicating tube and including:
a housing disposed on a wall of the communicating tube; and
a pivot arm connected to the housing and being pivotable between the communicating tube and the housing;
wherein the flow switch is configured to detect a fluid flow rate in the communicating tube and in response to the fluid flow rate in the communicating tube dropping below a predetermined value, the pivot arm is moved away from the housing to indicate a service condition for the filter cartridge.

2. The filtering device of claim 1, further comprising a reminding device operatively coupled to the flow switch, wherein the reminding device is configured to indicate the fluid flow rate in the communicating tube being less than the predetermined value.

3. The filtering device of claim 2, wherein the reminding device comprises a display device, a sound generating device or a communication module.

4. The filtering device of claim 2, wherein the reminding device comprises a display device configured to generate a visual indication in response to the fluid flow rate in the communicating tube being less than the predetermined value.

5. The filtering device of claim 2, wherein the reminding device comprises a sound generating device configured to generate an audible alert in response to the fluid flow rate in the communicating tube being less than the predetermined value.

6. The filtering device of claim 2, wherein the reminding device comprises a communication module configured to transmit an alert to a remote receiver in response to the fluid flow rate in the communicating tube being less than the predetermined value.

7. The filtering device of claim 1, wherein the flow switch is configured to be in an open state in response to the fluid flow rate in the communicating tube being lower than the predetermined value.

8. The filtering device of claim 1, wherein the flow switch comprises:
a magnetic block disposed at an end of the pivot arm; and
a reed switch disposed inside of the housing;
wherein the pivot arm is biased toward the reed switch by the fluid flow rate in the communicating tube; and
wherein the pivot arm and the magnetic block are pivoted away from the reed switch when the fluid flow rate in the communicating tube drops below the predetermined value, thereby causing the reed switch to change from one state to a different state.

9. The filtering device of claim 1, wherein the water pump employs a DC brushless motor.

10. The filtering device of claim 1, further comprising:
a first sealing ring for sealing between the communicating tube and the water pump; and
a second sealing ring for sealing between the communicating tube and the filter cartridge.

11. The filtering device according to claim 1, wherein the filtering device further comprises a cover disposed on the base and enclosing the water pump.

12. The filtering device of claim 1, wherein the filtering device further comprises a water inlet connected to the water pump and a water outlet connected to the filter cartridge; and
wherein the filtering device is configured to provide a fluid flow from the water inlet through the water pump, the filter cartridge, and then the water outlet.

13. The filtering device of claim 12, wherein the water inlet and the water outlet are each adapted to be connected to a pool body of a swimming pool.

14. A control system for the filtering device according to claim 1, the control system comprising:
a control panel for the filtering device;
a central control system; and
a filtration detecting system;
wherein the control panel for the filtering device is electrically connected to the central control system and adapted to control the central control system;
wherein the central control system is electrically connected to the filtration detecting system and adapted to control the filtration detecting system; and
wherein the filtration detecting system causes a reminding device to generate a first reminder signal in response to the flow switch detecting the fluid flow rate in the communicating tube being less than the predetermined value.

15. The control system of claim 14, wherein the control system further comprises an air discharge detecting system and a dry-run detecting system;
wherein the central control system is electrically connected to the air discharge detecting system and the dry-run detecting system, and the central control system is adapted to control the air discharge detecting system and the dry-run detecting system; and
wherein the dry-run detecting system causes the reminding device to generate a second reminder signal in response to an operating current of the water pump being less than a first predetermined current for a predetermined duration of time, and with the air discharge detecting system determining that an air discharge valve is open.

16. The control system of claim 15, wherein the dry-run detecting system causes the reminding device to generate the second reminder signal in response to the operating current of the water pump being less than 0.5 amperes for a duration of 1 minute, and with the air discharge detecting system determining that the air discharge valve is open.

17. The control system of claim 15, further comprising a locked-rotor detecting system;
wherein the central control system is electrically connected to the locked-rotor detecting system and adapted to control the locked-rotor detecting system;
wherein the locked-rotor detecting system causes the reminding device to generate a third reminder signal in response to the operating current of the water pump being greater than a second predetermined current.

18. The control system of claim 17, wherein the locked-rotor detecting system causes the reminding device to generate the third reminder signal in response to the operating current of the water pump being greater than 2 amperes.

19. The control system of claim 14, further comprising a remote control system configured to remotely control the central control system.

* * * * *